(12) United States Patent
Nanda et al.

(10) Patent No.: US 9,351,011 B2
(45) Date of Patent: May 24, 2016

(54) VIDEO PIPELINE WITH DIRECT LINKAGE BETWEEN DECODING AND POST PROCESSING

(71) Applicants: Akshat Nanda, El Dorado Hills, CA (US); Scott Janus, Rocklin, CA (US); Scott W Cheng, Folsom, CA (US)

(72) Inventors: Akshat Nanda, El Dorado Hills, CA (US); Scott Janus, Rocklin, CA (US); Scott W Cheng, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 13/687,093

(22) Filed: Nov. 28, 2012

(65) Prior Publication Data

US 2014/0146896 A1    May 29, 2014

(51) Int. Cl.
*H04N 19/44* (2014.01)
*H04N 19/42* (2014.01)
*H04N 19/85* (2014.01)

(52) U.S. Cl.
CPC ............... *H04N 19/44* (2014.11); *H04N 19/42* (2014.11); *H04N 19/85* (2014.11)

(58) Field of Classification Search
CPC .................... H04N 19/00533; H04N 19/44
USPC ..................................................... 375/240.25
See application file for complete search history.

(56) References Cited

U.S. PATENT DOCUMENTS

| | | | |
|---|---|---|---|
| 8,780,986 B2 * | 7/2014 | Wu ..................... | H04N 7/26031 375/240.13 |
| 2003/0103566 A1 * | 6/2003 | Stenzel ................... | G06T 9/004 375/240.12 |
| 2004/0076235 A1 | 4/2004 | Ju | |
| 2006/0048193 A1 * | 3/2006 | Jacobs ................. | H04N 5/4401 725/81 |
| 2006/0140271 A1 * | 6/2006 | Wedi ...................... | H04N 19/61 375/240.12 |
| 2006/0153296 A1 * | 7/2006 | Deng ................ | G06F 17/30799 375/240.12 |

(Continued)

FOREIGN PATENT DOCUMENTS

| | | |
|---|---|---|
| KR | 10-2005-0019809 A | 3/2005 |
| KR | 10-2005-0086835 A | 8/2005 |

(Continued)

OTHER PUBLICATIONS

International Search Report and Written Opinion received for Patent Application No. PCT/US2013/046322, mailed on Sep. 30, 2013, 11 pages.

(Continued)

*Primary Examiner* — Richard Torrente
*Assistant Examiner* — Irfan Habib
(74) *Attorney, Agent, or Firm* — Douglas J. Ryder; Ryder, Lu, Mazzeo & Konieczny LLC (57) ABSTRACT

In general, in one aspect, a decode order for a group of picture (GOP) frame structure for a video stream is modified to include regenerated P frames. The modified decode order includes a regenerated P frame of a P frame decoded prior to a sequence of B frames after last B frame in the sequence of B frames and before next I or P frame. The frames are decoded in modified decode order by a decode engine. The decoded frames are post processed in a display order (only includes regenerated P frames and does not include initial P frames defined in the decode order) by a post processing engine. The post processing engine may ignore the initial P frames or the decode engine may not forward the initial P frames to the post processing engine. The post processed frames may be prepared for presentation by a display engine.

19 Claims, 7 Drawing Sheets

(56) References Cited

U.S. PATENT DOCUMENTS

| | | | |
|---|---|---|---|
| 2007/0064800 A1* | 3/2007 | Ha | H04N 13/0048 375/240.12 |
| 2007/0073779 A1* | 3/2007 | Walker | H04N 21/23439 |
| 2008/0263616 A1* | 10/2008 | Sallinen | H04N 21/234327 725/131 |
| 2008/0267222 A1* | 10/2008 | Leung | H04N 21/23424 370/503 |
| 2009/0226107 A1* | 9/2009 | Lin | H04N 19/172 382/238 |
| 2009/0262804 A1 | 10/2009 | Pandit | |
| 2009/0285284 A1* | 11/2009 | Toma | H04N 19/70 375/240.12 |
| 2010/0014587 A1* | 1/2010 | Demos | H04N 19/00696 375/240.15 |
| 2010/0086280 A1* | 4/2010 | Sabo | H04N 5/783 386/343 |
| 2010/0316134 A1* | 12/2010 | Chen | H04N 21/21805 375/240.25 |
| 2011/0134994 A1* | 6/2011 | Lu | H04N 21/23424 375/240.02 |
| 2013/0219443 A1* | 8/2013 | Argyropoulos | H04N 17/00 725/109 |
| 2014/0056577 A1* | 2/2014 | Ogawa | H04N 19/30 386/329 |
| 2014/0147031 A1* | 5/2014 | Rzeszutek | G06T 7/0075 382/154 |

FOREIGN PATENT DOCUMENTS

| | | |
|---|---|---|
| KR | 10-2007-0033863 A | 3/2007 |
| KR | 10-2007-0055432 A | 5/2007 |
| KR | 10-2008-0075315 A | 8/2008 |

OTHER PUBLICATIONS

Richardson, Iain G., Frame and Picture Management, Jan. 29, 2004, 7 pages, available at http://www.rgu.ac.uk/files/avc_picmanagement_draft1.pdf.

European Search Report and Opinion by European Patent Office for Application No. 13859481.7, mailed on Mar. 21, 2016, 8 pages.

* cited by examiner

VIDEO PIPELINE WITH DIRECT LINKAGE BETWEEN DECODING AND POST PROCESSING

BACKGROUND

Video playback includes decoding of a video stream, performing different types of post processing on the decoded frames, and then rendering the video frame (image) for display. The post processing is intended to enhance the perceived visual quality of the pixels in the video frame. Current video playback pipelines work on a frame by frame basis where a host processor is involved with providing the frames one by one to the video pipeline and synchronizing the decoding, post processing and rendering functions. Furthermore, current decode engines write the reconstructed frame in decode order while current post processing engines read and render the reconstructed frames in display order. The reordering of the frames from decode order to display order is accomplished by storing the frames temporarily in memory. The host processor is involved in the reordering of the frames from those written to memory to those read from memory. Accordingly the host processor is active for large portions of the video pipeline. Furthermore, memory resources and bandwidth are required for this process.

BRIEF DESCRIPTION OF THE DRAWINGS

The features and advantages of the various embodiments will become apparent from the following detailed description in which.

DETAILED DESCRIPTION

Figure 1:
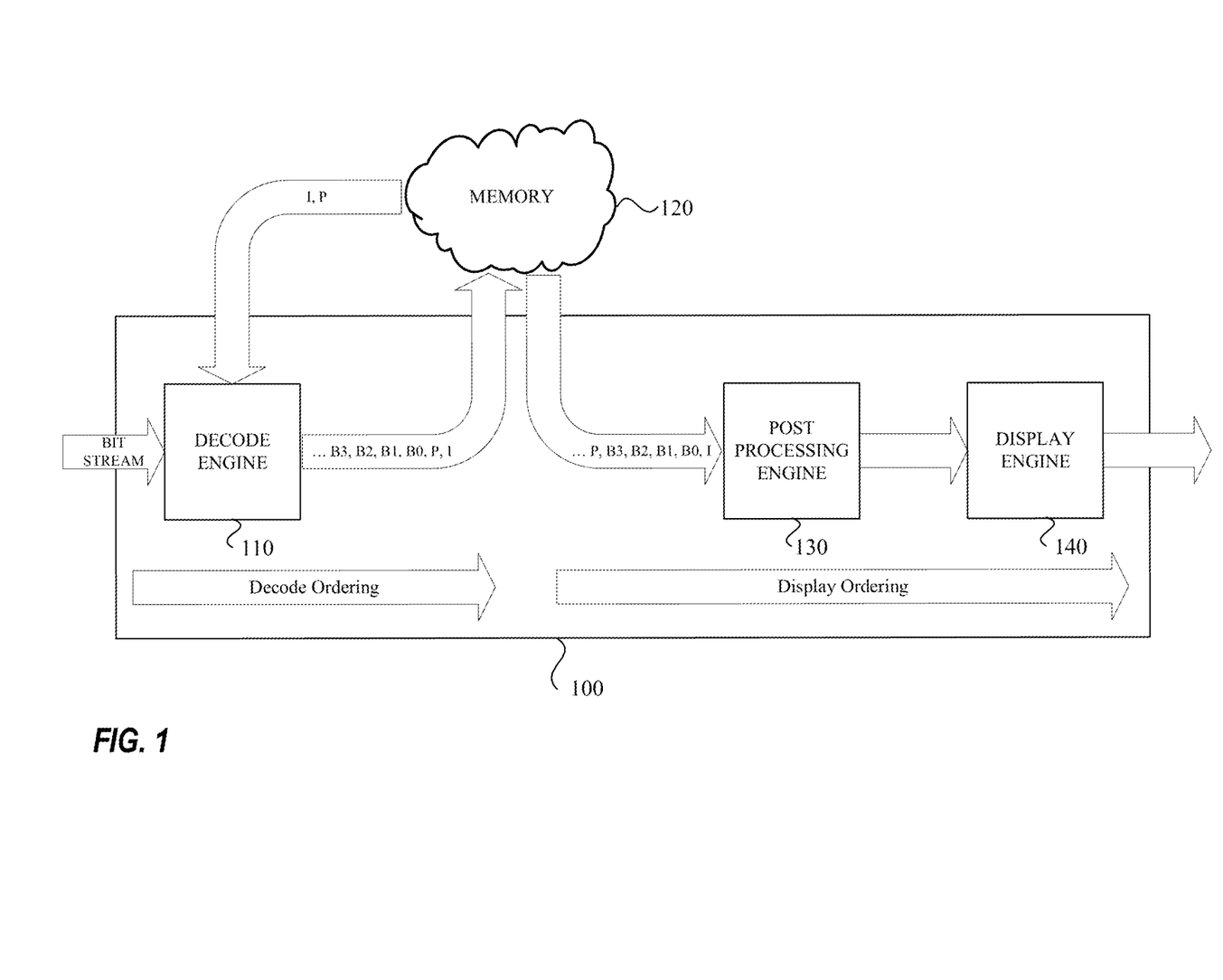
FIG. 1 illustrates a block diagram of an example video pipeline.

FIG. 1 illustrates a block diagram of an example video pipeline 100. The pipeline 100 includes a decode engine 110, a post processing engine 130 and a display engine 140. The video provided to the pipeline 100 may come from, for example, a medium (e.g., disk) or a network (e.g., cable network, Internet). The decode engine 110 may decode the video, the post processing engine 130 may modify the video (e.g., brightness, quality) based on various parameters, and the display engine 140 may prepare the video for presentation on a display device (not illustrated).

The decode engine 110 decodes frames in a decode order defined by a group of picture (GOP) frame structure for the video. The GOP frame structure is defined in the bit stream. The decode order requires P-frames (predictive frames) to be decoded prior to B-frames (bi-directionally predictive) as the B-frames are predicted based on the P-frames. After the frames are decoded they are to be post processed by the post processing engine 130 and rendered for display by the display engine 140. The post processing engine 130 and the display engine 140 process frames in a display order defined by the GOP frame structure. The display order includes B-frames being presented between I-frames (complete frames) and P-frames or between P-frames. By way of an example, the display order for a GOP structure may be I B1 B2 P1 B3 B4 P2, while the decode order may be I P1 B1 B2 P2 B3 B4 (the P-frames that are used to predict B-frames are decoded prior to the B-frames).

In order for the post processing engine 130 to process the frames, the frames are to be reordered. The post processing engine 130 does not have a large enough queue (not separately illustrated) to store enough frames or a scheduler (not separately illustrated) capable of managing the rescheduling required. Accordingly, the decode engine 110 and the post processing engine 130 may not be directly linked to one another. The decode engine 110 may write the decoded frames to memory 120, a host processor (not illustrated) may reorder the frames stored in the memory 120, and the frames may be read from the memory 120 by the post processing engine 130 in the correct order. As illustrated, the frames written to the memory 120 from the decode engine 110 were I, P, B0, B1, B2, B3 and the frames read from the memory 120 by the post processing engine 130 were I, B0, B1, B2, B3, P. It should also be noted that the I and the P frames are also read from the memory 120 by the decode engine 110 when needed for decoding of frames (e.g., I read for decoding of P, I and P read for decoding of B).

The host processor may receive the video and submit the frames to the video pipeline 100 (the decode engine 110), reorder the frames written to the memory 120, and monitor and synchronize the operations of the different engines. Accordingly, the host processor is active (woken up repeatedly) during the video pipeline operations. While the processing workload of the host processor in relation to the video pipeline operations is light, the continual waking up of the host process burns power. Accordingly, limiting the waking up of the host processor in relation to the video pipeline operations is desired.

Figure 2:
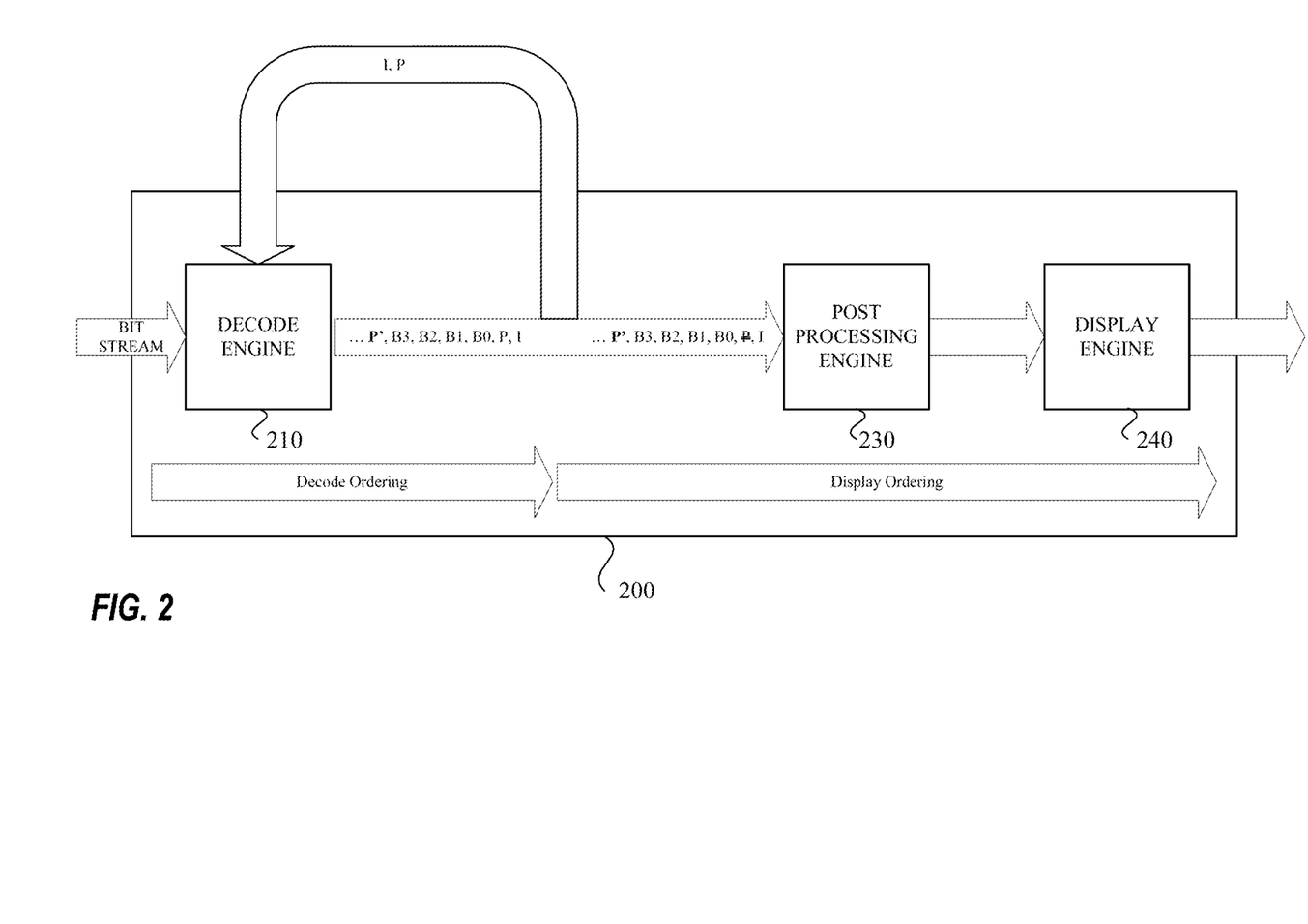
FIG. 2 illustrates a block diagram of an example video pipeline having the decoding and the post processing directly linked, according to one embodiment.

FIG. 2 illustrates a block diagram of an example video pipeline 200 having the decoding and the post processing directly linked. A direct linkage eliminates the need for frames to be saved and read from memory (e.g., 120 of FIG. 1) and reordered by a host processor (not illustrated). The pipeline 200 includes a decode engine 210, a post processing engine 230 and a display engine 240 (may function as display engine 140 of FIG. 1). The decode engine 210 decodes frames in the decode order defined by the GOP frame structure defined in the bit stream and then at the appropriate time (e.g., end of the GOP frame structure, before next I or P frame) decodes the P frame for the video stream again (regenerates the P frame). The regenerated P frame is referred to as P' to indicate it was added to the decode order. As illustrated, the decode order for the video stream is I, P, B0, B1, B2, B3 (same as FIG. 1) and then the P' frame is included. The decode engine 210 may feedback the I and the P frames to itself for decoding of other frames (e.g., I frames for decoding P frames, I and P frames for decoding B frames). The decode engine 210 may also provide the decoded frames in the modified decode order directly to the post processing engine 230.

The post processing engine 230 ignores (discards) the P frames in the original decode order of GOP frame structure (initial P frames) and processes the remaining frames, including the regenerated P' frames. As illustrated, the post processing engine 230 receives and processes an I frame, receives and ignores a P frame (initial P frame), receives and processes a plurality of B frames (B0-B3), and receives and processes the regenerated P' frame. By ignoring the initial P frame and processing the regenerated P' frame, the post processing engine 230 processes the frames in display order without the need for the frames to be stored in memory (e.g., 120 of FIG. 1) and reordered by the host processor.

Figure 3:
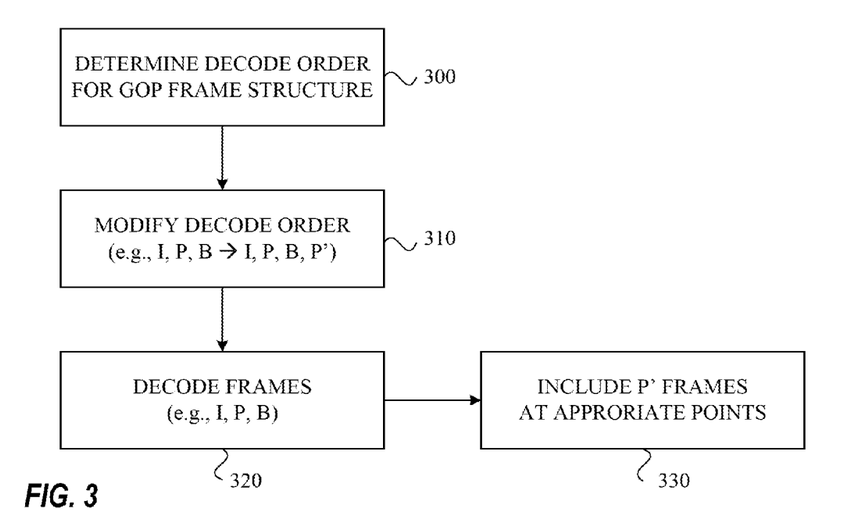
FIG. 3 illustrates an example operational flow of a decode engine, according to one embodiment.

FIG. 3 illustrates an example operational flow of a decode engine (e.g., 210 of FIG. 2). Initially the decode engine determines the decode order defined by the GOP frame structure for a video bit stream being provided to the video pipeline 300. The decode order is then modified to include the regeneration of the P' frames 310. The regenerated P' frames may be added at the conclusion of the decoding of B frames before the decoding of the next I or P frame (where P frame is included in a display order). For example, if the decode order was I1, P1, B1, B2, P2, B3, B4, I2 the modified decode order may be I1, P1, B1, B2, P1', P2, B3, B4, P2', I2. The P1' frame was added after the B2 frame and before the P2 frame and the P2' frame was added after the B4 frame and before the I2 frame. When the bit stream is received, the frames (I, P, and B) defined in the decode order of the GOP frame structure are decoded 320 and at the appropriate points the regenerated P' frames are included 330. The P' frames may be decoded just like the corresponding P frames were (P frame decoded second time). According to an alternative embodiment, the original decoded P frame may be stored in the decode engine and inserted at appropriate time for transmission to the post processing engine.

Figure 4:
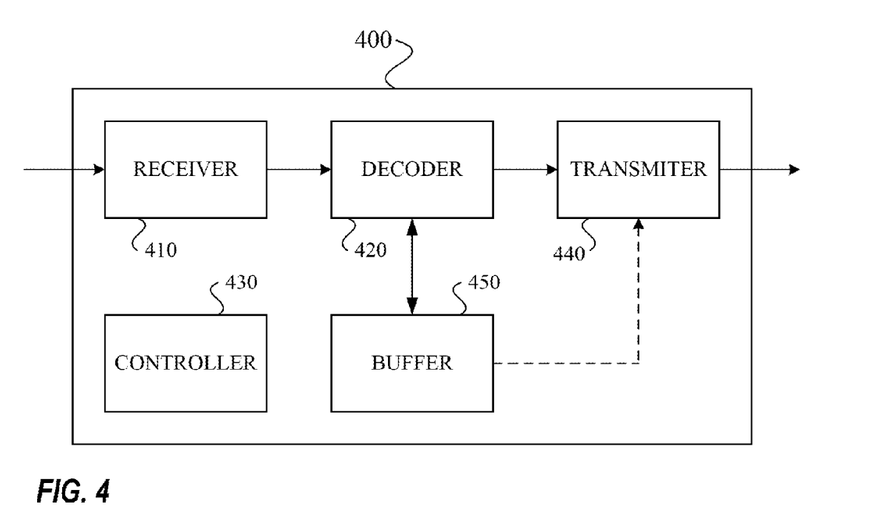
FIG. 4 illustrates an example functional diagram of a decode engine, according to one embodiment.

FIG. 4 illustrates an example functional diagram of a decode engine 400 (e.g., 210 of FIG. 2). The decode engine 400 may include a receiver 410, a decoder 420, a controller 430, a transmitter 440, and a buffer 450. The receiver 410 may receive a bit stream that defines the decode order for the GOP frame structure and includes encoded frames. The controller 430 may control the operation of the decode engine 400. The controller 430 may modify the decode order to include the P' frames at the appropriate points. The controller 430 may instruct the decoder 420 what type of frames it is decoding and what frames it needs for decoding (e.g., I frames for decoding of P frames, I and P frames for decoding of B frames). The decoder 420 may decode the frames and store the I and P frames in the buffer 450 and retrieve the I and P frames from the buffer 450 when needed. The transmitter 440 may forward the decoded frames to the post processing engine. The buffer 450 may temporarily store the frames needed to decode other frames (e.g., I and P frames).

The decoder 420 may decode each P frame twice (once in decode order and once in display order). Accordingly, an I frame may be maintained in the buffer 450 longer than if just the initial P frame was decoded. In an alternative embodiment, the transmitter 450 may retrieve the P frame decoded in the decode order from the buffer 450 at the point in time where the P' frame should be included (where P frame is required for the display order).

Figure 5:
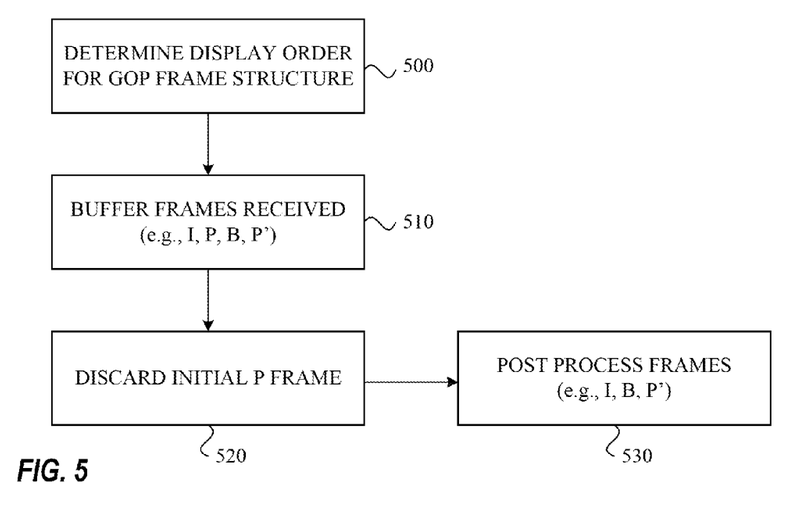
FIG. 5 illustrates an example operational flow of a post-processing engine, according to one embodiment.

FIG. 5 illustrates an example operational flow of a post-processing engine (e.g., 230 of FIG. 2). Initially the post-processing engine determines the display order defined by the GOP frame structure for the video bit stream being provided to the video pipeline 500. The decoded frames may be temporarily stored in a buffer 510. The initial P frames are dropped from the buffer and not processed 520. The frames that are ignored or discarded may be those that do not match the display order. For example, if the display order is I, B, B, P and the frames in the buffer are I, P, B, B, P', the initial P may be ignored/discarded because it does not fit in the defined order. Alternatively, the display order may be modified to include the initial P and instructions to ignore/discard that frame. That is, the display order may be modified from, for example, I, B, B, P to I, P''', B, B, P where P''' is the initial frame that should be ignored/discarded. The remaining frames (I, B and P') are post processed 530.

Figure 6:
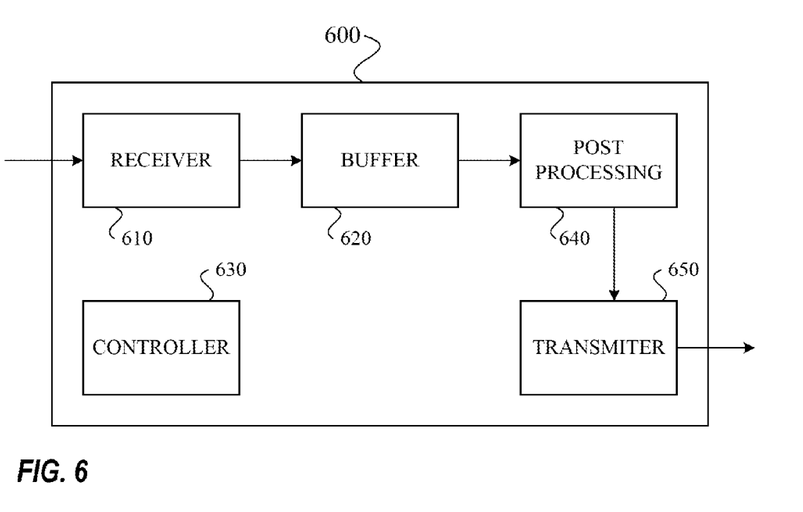
FIG. 6 illustrates an example functional diagram of a post processing engine, according to one embodiment.

FIG. 6 illustrates an example functional diagram of a post processing engine 600 (e.g., 230 of FIG. 2). The post-processing engine 600 may include a receiver 610, a buffer 620, a controller 630, a post processor 640, and a transmitter 650. The receiver 610 may receive a bit stream that defines the display order for the GOP frame structure and includes decoded frames. The decoded frames may be temporarily stored in the buffer 620. The controller 630 may control the operation of the post processing engine 600. The controller 630 may monitor the frames received and discard frames that do not match the display order from the buffer 620. Alternatively, the controller 630 may instruct the post processor 640 not to retrieve (to ignore) frames that do not match the display order from the buffer 620. According to an alternative embodiment, the controller 630 may modify the display order and identify the frames (P''') to be discarded from the buffer 630 or ignored by the post processor 640. The post processor 640 may process the frames and the transmitter 650 may forward the frames to the display engine.

Figure 7:
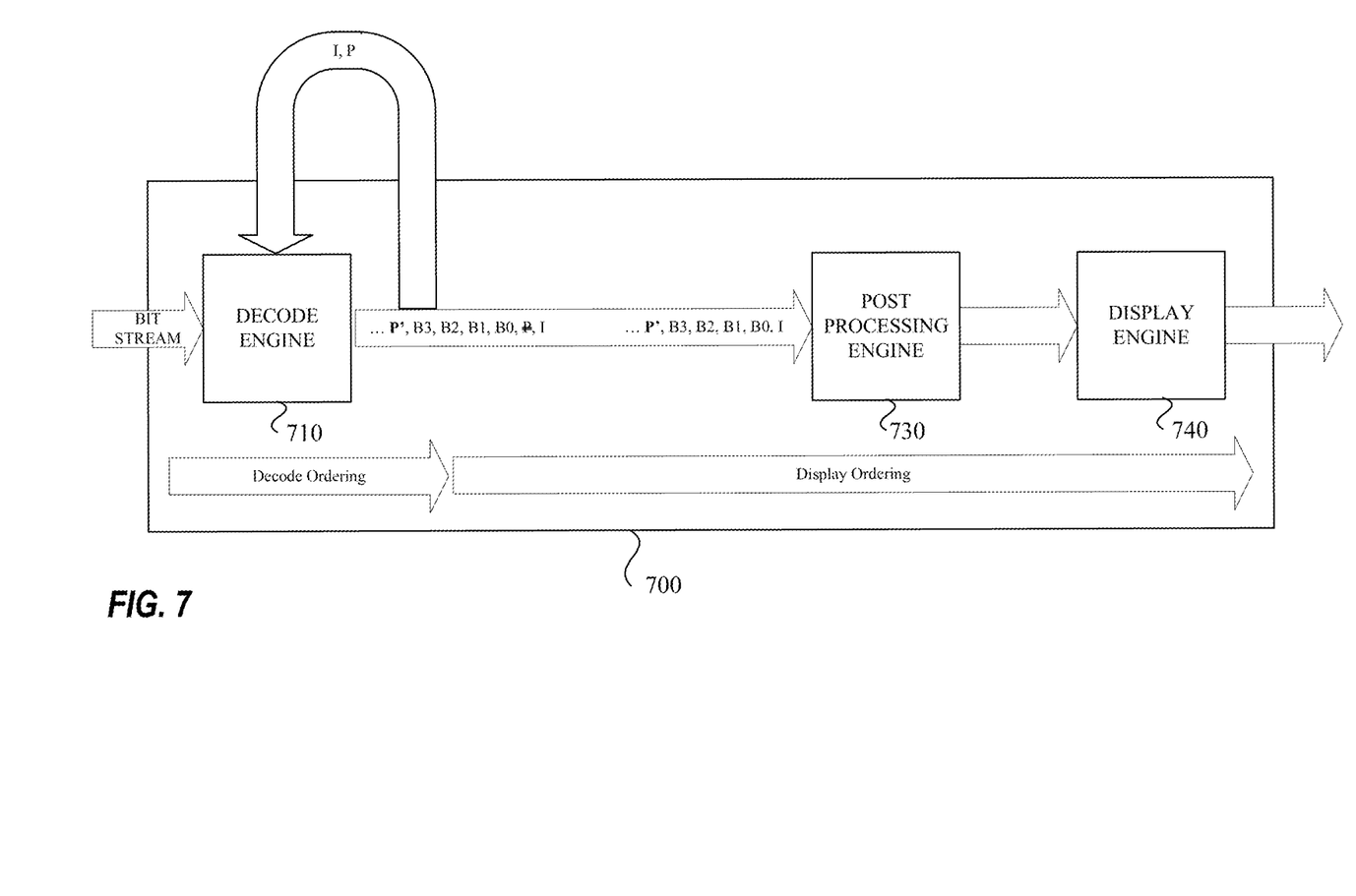
FIG. 7 illustrates a block diagram of an example video pipeline having the decoding and the post processing directly linked, according to one embodiment.

FIG. 7 illustrates a block diagram of an example video pipeline 700 having the decoding and the post processing directly linked. The pipeline 700 includes a decode engine 710, a post processing engine 730 (may function as post processing engine 130 of FIG. 1) and a display engine 740 (may function as display engine 140 of FIG. 1 and/or 240 of FIG. 2). The decode engine 710 decodes frames in the decode order defined by the GOP frame structure defined in the bit stream, adds the regenerated P' frame at the appropriate time (e.g., end of the GOP frame structure, before next I or P frame), and forwards the decoded frames excluding the initial P frames to the post processing engine 730. The decode engine 710 may feedback the I and P frames to itself for decoding of P and B frames. The initial P frames may be discarded before the frames are transported to the post processing engine 730. For example, referring back to FIG. 4 the initial P frames may be discarded by the decoder 420 before being provided to the transmitter 440 or the transmitter 440 may discard the initial P frames. Alternatively, all the frames may be temporally stored in the buffer 450 and the transmitter 440 may not retrieve the initial P frames therefrom.

The video pipeline disclosed with respect to FIGS. 2-7 may be implemented in whole or in part, in a central processing unit (CPU), a graphics processing unit (GPU), a system on a chip (SOC), one or more discrete components or some combination thereof. Furthermore, the operations may be implemented in hardware, software, firmware or some combination thereof. The CPU, GPU, and/or SOC may have access to device readable storage (on the device, off the device, or some combination thereof) that contains instructions that when executed by the device causes the device to perform at least a subset of the operations described above in FIGS. 2-7. The video pipeline described enables the various aspects of the video pipeline (decode, post-process) to be directly linked together which enables the host processor to not need to be continually woken during the process. This video pipeline enables the system it is incorporated in to conserve power and processing resources.

The various embodiments described above may be implemented in various systems that display content (content display systems) and the content display systems may be incorporated in various devices.

Figure 8:
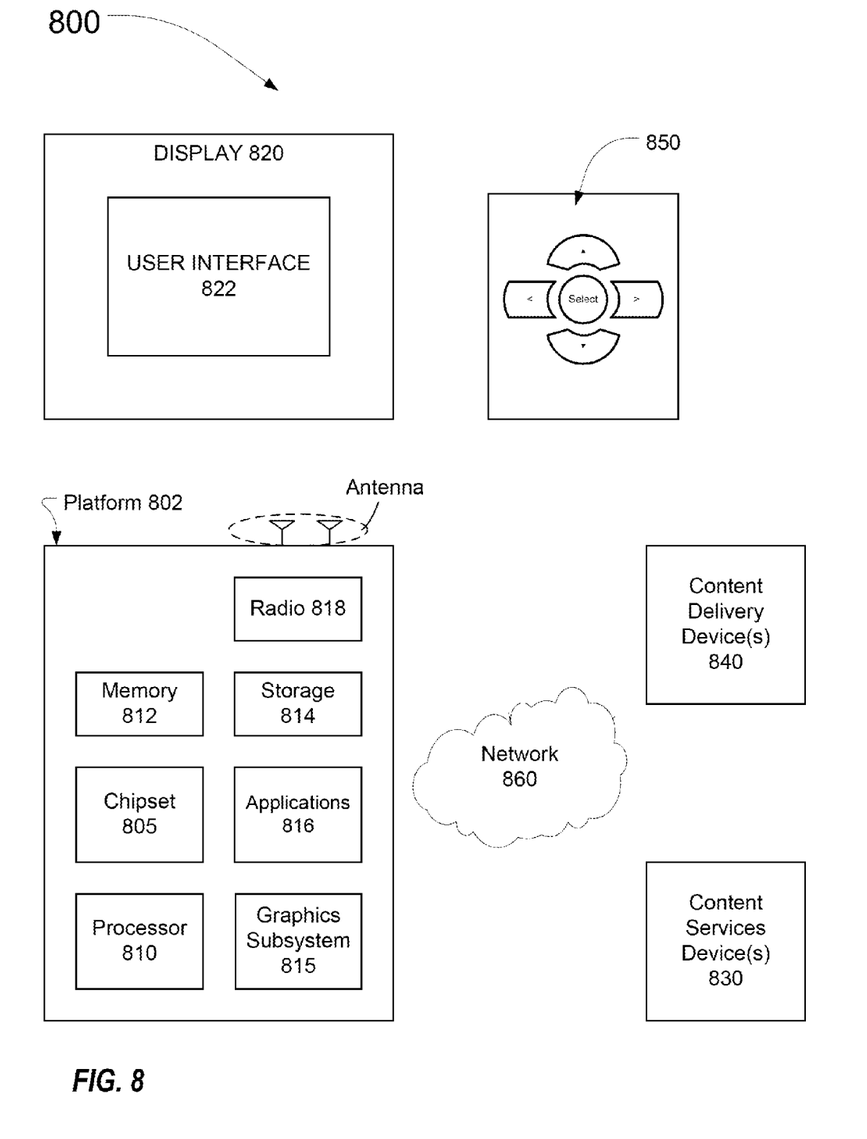
FIG. 8 illustrates an example content display system, according to one embodiment.

FIG. 8 illustrates an example content display system 800. The system 800 may be a media system although it is not limited to this context. The system 800 may be incorporated into, for example, a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 800 comprises a platform 802 coupled to an external display 820. The platform 802 may receive content from a content device such as content services device(s) 830, content delivery device(s) 840 or other similar content sources. A navigation controller 850 comprising one or more navigation features may be used to interact with, for example, the platform 902 and/or the display 820.

In embodiments, the platform 802 may comprise any combination of a chipset 805, a processor 810, memory 812, storage 814, a graphics subsystem 815, applications 816 and/or a radio 818. The chipset 805 may provide intercommunication among the processor 810, the memory 812, the storage 814, the graphics subsystem 815, the applications 816 and/or the radio 818. The chipset 805 may, for example, include a storage adapter (not depicted) capable of providing intercommunication with the storage 814.

The processor 810 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 810 may comprise dual-core processor(s), dual-core mobile processor(s), and so forth.

The memory 812 may be implemented as a volatile memory device such as, but not limited to, a Random Access Memory (RAM), Dynamic Random Access Memory (DRAM), or Static RAM (SRAM).

The storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, the storage 814 may comprise technology to increase the storage performance or enhanced protection for valuable digital media when multiple hard drives are included, for example.

The graphics subsystem 815 may perform processing of images such as still or video for display. The graphics subsystem 815 may be a graphics processing unit (GPU) or a visual processing unit (VPU), for example. An analog or digital interface may be used to communicatively couple the graphics subsystem 815 and the display 820. For example, the interface may be any of a High-Definition Multimedia Interface, DisplayPort, wireless HDMI, and/or wireless HD compliant techniques. The graphics subsystem 815 could be integrated into the processor 810 or the chipset 805. The graphics subsystem 815 could be a stand-alone card communicatively coupled to the chipset 805.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, the radio 818 may operate in accordance with one or more applicable standards in any version.

In embodiments, the display 820 may comprise any television type monitor or display. The display 820 may comprise, for example, a computer display screen, touch screen display, video monitor, television-like device, and/or a television. The display 820 may be digital and/or analog. In embodiments, the display 820 may be a holographic display. Also, the display 820 may be a transparent surface that may receive a visual projection. Such projections may convey various forms of information, images, and/or objects. For example, such projections may be a visual overlay for a mobile augmented reality (MAR) application. Under the control of one or more software applications 816, the platform 802 may display the user interface 822 on the display 820.

In embodiments, the content services device(s) 830 may be hosted by any national, international and/or independent service and thus accessible to the platform 802 via the Internet, for example. The content services device(s) 830 may be coupled to the platform 802 and/or to the display 820. The platform 802 and/or the content services device(s) 830 may be coupled to a network 860 to communicate (e.g., send and/or receive) media information to and from the network 860. The content delivery device(s) 840 also may be coupled to the platform 802 and/or to the display 820.

In embodiments, the content services device(s) 830 may comprise a cable television box, personal computer, network, telephone, Internet enabled devices or appliance capable of delivering digital information and/or content, and any other similar device capable of unidirectionally or bidirectionally communicating content between content providers and the platform 802 and/or the display 820, via the network 860 or directly. It will be appreciated that the content may be communicated unidirectionally and/or bidirectionally to and from any one of the components in the system 800 and a content provider via the network 860. Examples of content may include any media information including, for example, video, music, medical, gaming information, and so forth.

The content services device(s) 830 receives content such as cable television programming including media information, digital information, and/or other content. Examples of content providers may include any cable or satellite television or radio or Internet content providers. The provided examples are not meant to limit embodiments of the invention.

In embodiments, the platform 802 may receive control signals from navigation controller 850 having one or more navigation features. The navigation features of the controller 850 may be used to interact with the user interface 822, for example. In embodiments, the navigation controller 850 may be a pointing device that may be a computer hardware component (specifically human interface device) that allows a user to input spatial (e.g., continuous and multi-dimensional) data into a computer. Many systems such as graphical user interfaces (GUI), televisions and monitors allow the user to control and provide data to the computer or television using physical gestures.

Movements of the navigation features of the controller 850 may be echoed on a display (e.g., display 820) by movements of a pointer, cursor, focus ring, or other visual indicators displayed on the display. For example, under the control of software applications 816, the navigation features located on the navigation controller 850 may be mapped to virtual navigation features displayed on the user interface 822, for example. In embodiments, the controller 850 may not be a separate component but integrated into the platform 802 and/or the display 820. Embodiments, however, are not limited to the elements or in the context shown or described herein.

In embodiments, drivers (not shown) may comprise technology to enable users to instantly turn on and off the platform 802 like a television with the touch of a button after initial boot-up, when enabled, for example. Program logic may allow the platform 802 to stream content to media adaptors or other content services device(s) 830 or content delivery device(s) 840 when the platform is turned "off." In addition, the chipset 805 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 800 may be integrated. For example, the platform 802 and the content services device(s) 830 may be integrated, or the platform 802 and the content delivery device(s) 840 may be integrated, or the platform 802, the content services device(s) 830, and the content delivery device(s) 840 may be integrated, for example. In various embodiments, the platform 802 and the display 820 may be an integrated unit. In various embodiments, the display 820 and the content service device(s) 830 may be integrated, or the display 820 and the content delivery device(s) 840 may be integrated, for example. These examples are not meant to limit the invention.

In various embodiments, the system 800 may be implemented as a wireless system, a wired system, or a combination of both. When implemented as a wireless system, the system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, the system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
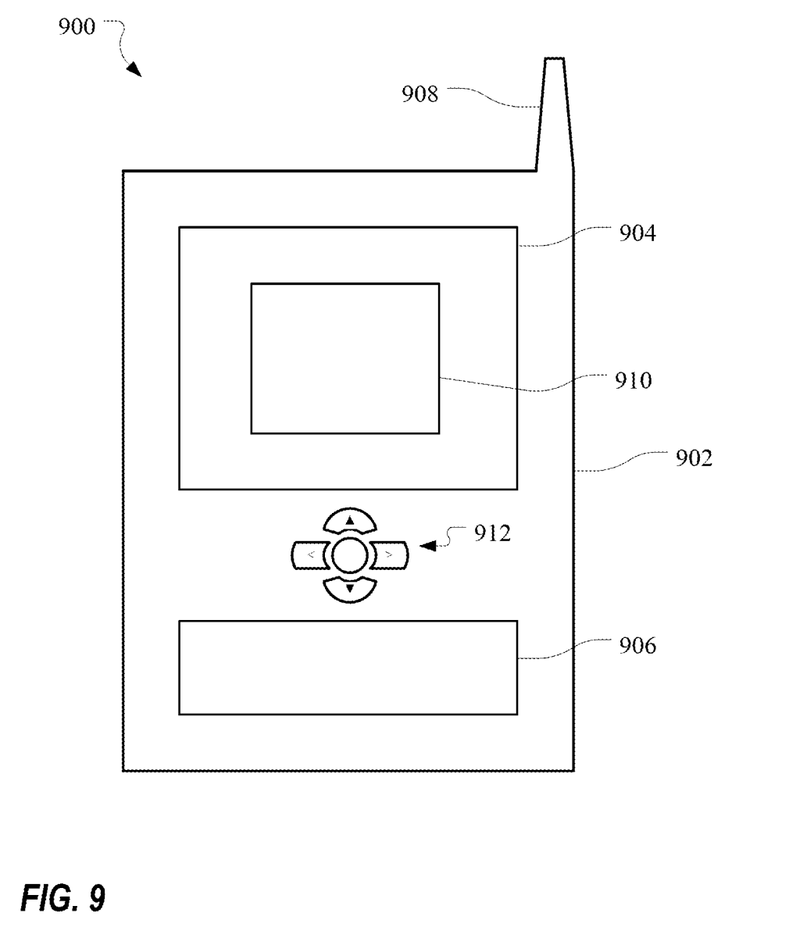
FIG. 9 illustrates an example small form factor device in which the system of FIG. 8 may be embodied, according to one embodiment.

As described above, the system 800 may be embodied in varying physical styles or form factors. FIG. 9 illustrates embodiments of a small form factor device 900 in which the system 800 may be embodied. In embodiments, for example, the device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example the mobile computing device may be utilized in a vehicle (e.g., car, truck, van). The in-vehicle device may provide information and/or entertainment to occupants of the vehicle (in-vehicle infotainment (IVI) device). The IVI device may utilize power from the vehicle as an external power source in addition to, or in place of, an internal battery powering the device.

In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The device 900 may comprise a housing 902, a display 904, an input/output (I/O) device 906, and an antenna 908. The device 900 also may comprise navigation features 912. The display 904 may comprise any suitable display unit for displaying information appropriate for a mobile computing device. The I/O device 906 may comprise any suitable I/O device for entering information into a mobile computing device. Examples for the I/O device 906 may include an alphanumeric keyboard, a numeric keypad, a touch pad, input keys, buttons, switches, rocker switches, microphones, speakers, voice recognition device and software, and so forth. Information also may be entered into the device 900 by way of microphone. Such information may be digitized by a voice recognition device. The embodiments are not limited in this context. The device 900 may include a battery (not illustrated) to provide power thereto. The battery may be located in the device 900 (e.g., within the housing 902) and/or may be remote from the device 900 (e.g., vehicle battery utilized for IVI device).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A method comprising:
   receiving an encoded video bit stream;
   determining a decode order for a group of picture (GOP) frame structure defined in the video bit stream, wherein the GOP frame structure includes an I frame, a plurality of P frames and a plurality of B frames, wherein the decode order for the GOP frame structure includes
      the I frame,
      a first P frame of the plurality of P frames,
      a first subset of the plurality of B frames, wherein the first subset is associated with the I frame and the first P frame,
      at least a second P frame, and
      at least a second subset of B frames, wherein the second subset is associated with the first P frame and the second P frame;
   decoding encoded frames received in the video bit stream per the decode order;
   inserting additional decoded P frames that are same as decoded P frames including inserting an additional first decoded P frame after the first decoded subset of B frames and at least an additional second decoded P frame after the second decoded subset of B frames;
   forwarding the decoded frames, including the additional decoded P frames, for further processing on the decoded frames in a display order, that is different than the decode order, without requiring the decoded frames to be stored in memory or reordered from the order they were decoded and forwarded;
   receiving the forwarded decoded frames, wherein the forwarded decoded frames received have not be reordered from those that were decoded and forwarded;
   post processing the received decoded frames, excluding the first decoded P frame and at least the second decoded P frame, wherein by excluding the decoded P frames the decoded frames are processed in the display order, wherein the display order for the GOP frame structure includes
      the I frame,
      the first subset of B frames,
      the additional first decoded P frame,
      at least the second subset of B frames, and
      at least the additional second decoded P frame; and
   preparing the post-processed frames for presentation on a display.

2. The method of claim 1, wherein the inserting includes decoding the encoded P frames for a second time to create the additional decoded P frames.

3. The method of claim 1, wherein the inserting includes temporarily storing decoded P frames and inserting the stored decoded P frames as the additional decoded P frames.

4. The method of claim 1, wherein the forwarding the decoded frames includes forwarding the decoded frames excluding the decoded P frames.

5. The method of claim 4, wherein the excluding the decoded P frames includes excluding the decoded P frames that do not match a display order for the GOP frame structure.

6. The method of claim 1, wherein the determining the decode order, the decoding encoded frames, and the inserting the additional decoded P frames are performed by a decode engine.

7. The method of claim 1, wherein the excluding the decoded P frames is performed by a post processing engine.

8. The method of claim 1, wherein the determining the decode order, the decoding encoded frames, the inserting the additional decoded P frames, and the forwarding the decoded P frames are performed by a decode engine.

9. A video pipeline comprising:
   a decode engine to:
      receive an encoded video bit stream;
      determine a decode order for a group of picture (GOP) frame structure for the video bit stream, wherein the GOP frame structure includes an I frame, a plurality of P frames and a plurality of B frames, wherein the decode order for the GOP frame structure includes
         the I frame,
         a first P frame of the plurality of P frames,
         a first subset of the plurality of B frames, wherein the first subset is associated with the I frame and the first P frame,
         at least a second P frame, and at least a second subset of B frames, wherein the second subset is associated with the first P frame and the second P frame;

decode encoded frames received in the video bit stream per the decode order;

insert additional decoded P frames that are same as decoded P frames including an additional first decoded P frame after the first decoded subset of B frames and at least an additional second decoded P frame after the second decoded subset of B frames; and forward the decoded frames, including the additional decoded P frames for further processing in a display order, that is different than the decode order, without requiring the decoded frames to be stored in memory or reordered from the order they were decoded and forwarded;

a post processing engine to:
receive the forwarded decoded frames directly from the decode engine, wherein the forwarded decoded frames received have not be reordered from those that were decoded and forwarded from the decode engine; and perform post processing on the received decoded frames, excluding the first decoded P frame and at least the second decoded P frame, wherein by excluding the decoded P frames the decoded frames are processed in the display order, wherein the display order for the GOP frame structure includes
the I frame,
the first subset of B frames,
the additional first decoded P frame,
at least the second subset of B frames, and
at least the additional second decoded P frame; and a display engine to prepare the post-processed frames for presentation on a display device.

10. The video pipeline of claim 9, wherein the decode engine is further to
decode the first P frame a second time; and
decode at least the second P frame a second time.

11. The video pipeline of claim 9, wherein the decode engine is further to
temporarily store the first decoded P frame and at least the second decoded P frame; and
insert the temporality stored first decoded P frame as the additional first decoded P frame and at least the temporarily stored second decoded P frame as at least the additional second decoded P frame.

12. The video pipeline of claim 9, wherein the post processing engine is to ignore the decoded P frames that do not match the display order.

13. The video pipeline of claim 9, wherein the post processing engine is to discard the decoded P frames that do not match the display order.

14. The video pipeline of claim 9, wherein the decode engine is to forward the decoded frames to the post processing engine excluding the decoded P frames.

15. A system comprising:
a video source to provide a video stream;
a host processor;
a video pipeline including:
a decode engine to
determine a decode order for a group of picture (GOP) frame structure for the video stream, wherein the GOP frame structure includes an I frame, a plurality of P frames and a plurality of B frames, wherein the decode order for the GOP frame structure includes
the I frame,
a first P frame of the plurality of P frames,
a first subset of the plurality of B frames, wherein the first subset is associated with the I frame and the first P frame,
at least a second P frame, and
at least a second subset of B frames, wherein the second subset is associated with the first P frame and the second P frame;

decode encoded frames received in the video bit stream per the decode order; and insert additional decoded P frames that are same as decoded P frames including an additional first decoded P frame after the first decoded subset of B frames and at least an additional second decoded P frame after the second decoded subset of B frames;

a post processing engine to perform post processing on the decoded frames, excluding the first decoded P frame and at least the second decoded P frame, wherein by excluding the decoded P frames the decoded frames are processed in a display order for the GOP frame structure for the video stream that is different than the decode order, without requiring the decoded frames to be stored in memory or reordered from the frames processed by the decode engine, wherein the display order includes
the I frame,
the first subset of B frames,
the additional first decoded P frame,
at least the second subset of B frames, and
at least the additional second decoded P frame; and a display engine to prepare the post-processed frames for presentation; and a display device to display the video stream.

16. The system of claim 15, wherein the decode engine is further to
decode the first P frame a second time; and
decode at least the second P frame a second time.

17. The system of claim 15, wherein the post processing engine is to not post-process decoded P frames that do not match the display order.

18. A non-transitory processor readable storage medium storing instructions, wherein when the instructions are executed by the processor they cause the processor to:
decode frames from a video bit stream according to a decode order for a group of picture (GOP) frame structure, wherein the GOP frame structure includes an I frame, a plurality of P frames and a plurality of B frames, wherein the decode order for the GOP frame structure includes
the I frame,
a first P frame of the plurality of P frames,
a first subset of the plurality of B frames, wherein the first subset is associated with the I frame and the first P frame,
at least a second P frame, and
at least a second subset of B frames, wherein the second subset is associated with the first P frame and the second P frame;

insert additional decoded P frames that are same as decoded P frames including an additional first decoded P frame after the first decoded subset of B frames and at least an additional second decoded P frame after the second decoded subset of B frames; and post process the decoded frames, including the additional decoded P frames and excluding the decoded P frames, wherein by excluding the decoded P frames the decoded frames are processed in a display order that is different than the decode order, without requiring the decoded frames to be stored in memory or reordered, wherein the display order includes the I frame, the first subset of B frames, the additional first decoded P frame, at least the second subset of B frames, and at least the additional second decoded P frame.

19. The non-transitory processor readable storage medium of claim 18, wherein when the instructions are executed by the processor they further cause the processor to prepare the post-processed frames for presentation on a display.

* * * * *